(12) United States Patent
Cerato

(10) Patent No.: US 7,366,413 B2
(45) Date of Patent: Apr. 29, 2008

(54) MODULAR CROSS CONNECT SYSTEM WITH 3D-MEMS FOR OPTICAL TELECOMMUNICATION NETWORKS

(75) Inventor: Ugo Cerato, Chiavari (IT)

(73) Assignee: Marconi Communications S.p.A., Genoa (IT)

( * ) Notice: Subject to any disclaimer, the term of this patent is extended or adjusted under 35 U.S.C. 154(b) by 659 days.

(21) Appl. No.: 10/480,985

(22) PCT Filed: Jun. 24, 2002

(86) PCT No.: PCT/IB02/03189

§ 371 (c)(1),
(2), (4) Date: Aug. 5, 2004

(87) PCT Pub. No.: WO03/003787

PCT Pub. Date: Jan. 9, 2003

(65) Prior Publication Data

US 2004/0258349 A1   Dec. 23, 2004

(30) Foreign Application Priority Data

Jun. 29, 2001   (IT) .......................... MI2001A1373

(51) Int. Cl.
*H04J 14/00* (2006.01)

(52) U.S. Cl. ........................... 398/50; 398/45; 398/46; 398/47; 398/48; 398/51; 398/52; 398/53; 398/56; 398/54; 398/33; 398/38; 398/79; 398/1; 398/2; 398/82; 398/83; 398/10; 398/12; 398/17; 398/19; 385/16; 385/17; 385/18; 385/24; 385/37; 370/217; 370/218; 370/219; 370/220

(58) Field of Classification Search .................. 398/50, 398/51, 52, 53, 54, 55, 56, 45, 46, 47, 48, 398/49, 33, 38, 79, 10, 12, 83, 17, 18, 82, 398/1, 2, 19; 385/24, 16, 17, 18, 37; 370/217, 370/219, 220, 218
See application file for complete search history.

(56) References Cited

U.S. PATENT DOCUMENTS 6,374,007 B1 * 4/2002 Hagelin et al. ............... 385/17

(Continued)

FOREIGN PATENT DOCUMENTS

WO   WO 01/33896 A1   5/2001

(Continued)

OTHER PUBLICATIONS

*Micro-Electro-Mechanical Systems (MEMS) for WDM Optical=Crossconnect Networks*, L. Y. Lin, et al., Military Communications Conference Proceedings, 1999, Piscataway, NJ, IEEE, US, Oct. 31, 1999, pp. 954-957.

*Primary Examiner*—Hanh Phan
(74) *Attorney, Agent, or Firm*—Kirschstein, et al.

(57) ABSTRACT

A modular cross connect system for optical telecommunication networks has the optical unit divided in at least two main bodies with one section for connection comprising the collimators and a main commutation section with MEMS devices. The first section is a fixed part while the second section is a readily removable section. The two sections face each other through a window and, in the first section, optics are provided for steering all or part of the optical signals from and to the main MEMS unit to a MEMS standby or protection plane to allow replacement of the main MEMS unit without interrupting service.

22 Claims, 7 Drawing Sheets

U.S. PATENT DOCUMENTS 6,798,992 B1 * 9/2004 Bishop et al. ................ 398/45
6,882,765 B1 * 4/2005 Erickson et al. .............. 385/16
6,882,766 B1 * 4/2005 Corbalis et al. ............. 385/16

FOREIGN PATENT DOCUMENTS

WO    WO 01/80593 A1    10/2001
WO    WO 01/90594 A2    10/2001

* cited by examiner

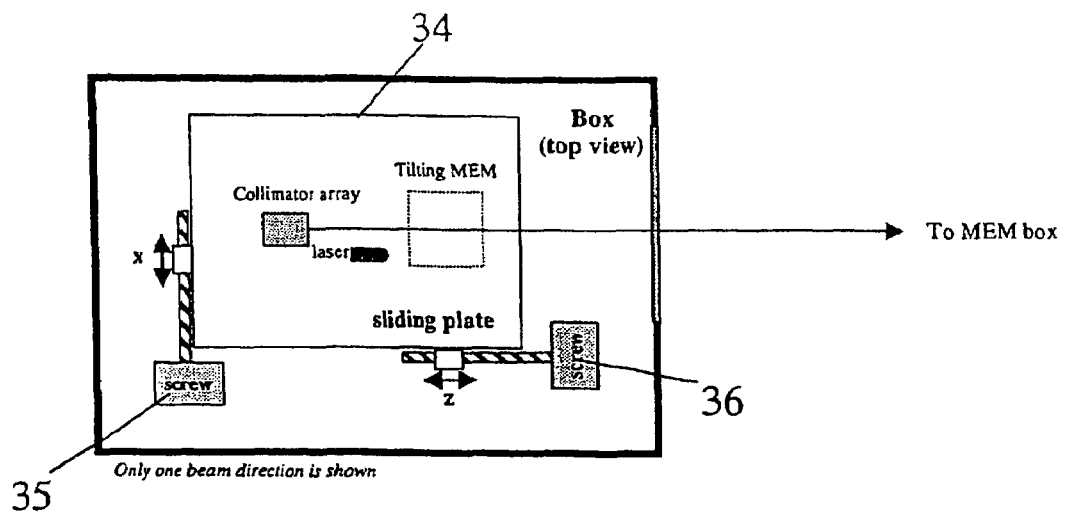
Fig. 14
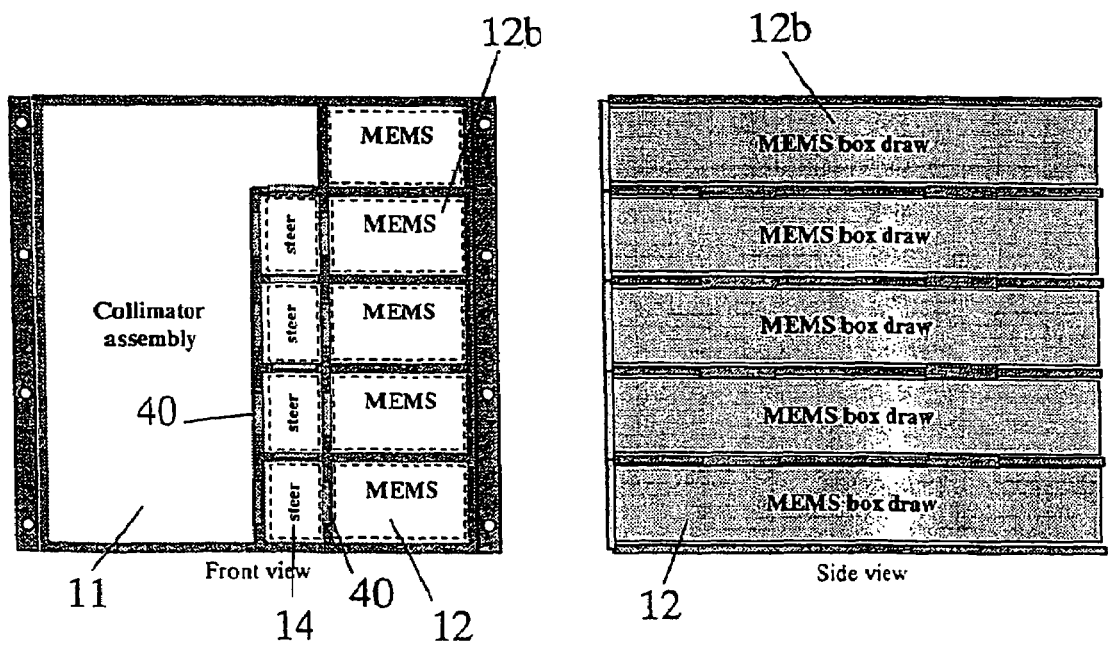
Fig. 15
Fig. 16

MODULAR CROSS CONNECT SYSTEM WITH 3D-MEMS FOR OPTICAL TELECOMMUNICATION NETWORKS

BACKGROUND OF THE INVENTION

The present invention relates to an innovative telecommunication cross connect structure based on 3D-MEMS.

Optical switching devices termed Cross Connect Switch (OXCs) for routing of optical signals in telecommunication systems are well known. The more conventional OXCs perform routing of optical signals by first converting them into electrical signals which are routed to the appropriate output port by means of electronic circuits and are then reconverted into optical signals. The switching takes place in this manner on electrical signals. With the progressive increase in transmission speeds, band widths and network complexity, conversion of signals from optical to electrical and again optical becomes ever more difficult, costly and cumbersome.

OXCs have therefore been proposed in which switching takes place directly on the optical signals employing the so-called MEMS (Micro Electro Mechanical System) members. These are virtually arrays of micro mirrors realized advantageously on silicon chips by techniques similar to those of integrated circuit production and which are controlled electrically to be oriented so as to direct the optical signals towards the appropriate output ports. It is thus possible to perform switching between a high number of ports without going through conversion of the optical signal into electrical signals. In using MEMS systems the 3D-MEMS technology appears to be the most promising.

In the more modern telecommunication networks very high data flows have to be managed and this requires highly reliable equipment. For this reason protection of the system is one of the main points which have to be faced. Another important feature is low loss of insertion in order to allow completely transparent optical switching in environments with long or very long sections. The two requirements are usually in conflict with one another. Indeed, to supply adequate protection, additional optical circuitries with associated losses and interconnections are necessary. In addition, the additional optical circuitry adds costs to the OXC architecture with MEMS.

A typical architecture comprises optical switches located on the optical cards with additional circuitry necessary for detecting optical input and output power. The main blocks of this architecture are two MEMS units with associated control electronics and various optical cards with the input-output ports and associated switches and control outlets.

A heavy optical interconnection with associated high losses and complexity is required between all the blocks.

Management of the optical fibers is then another key point in the development of OXC.

In the prior art the functions of the optical cards are partially realized even within the MEMS units to detect optical power feedback to perform fine setting of the mirrors during operation. As an alternative, more optical circuitry can be added.

However that may be, the result is always additional costs and signal losses.

The MEMS units and optical cards are often located in different racks because of the considerable space occupied by all the blocks. This causes considerable problems in management of the optical fiber arrangement.

The general purpose of the present invention is to remedy the above mentioned shortcomings by making available an innovative OCX structure with MEMS switching units which among other things should be modular, relatively low in cost, and easy to update and maintain while supplying very high performance.

SUMMARY OF THE INVENTION

In view of this purpose it was sought to provide in accordance with the present invention a cross connect system for optical telecommunication networks comprising input and output ports which are variously interconnected by means of switching members characterized in that it has a connecting section comprising in turn said ports and a main switching section comprising the switching members in the form of MEMS devices with the switching section contained in a quickly removable box and the connecting section comprising optical switch means which intercept on command optical paths between the two sections to deflect them from the main switching section towards a protective switching section.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings:

FIG. 14 shows diagrammatically a detail of the variant of FIG. 13, FIGS. 15 and 16 show diagrammatically front and side views of a subrack containing a modular embodiment of an OXC applying the principles of the present invention.

DETAILED DESCRIPTION OF THE PREFERRED EMBODIMENTS

Figure 1:
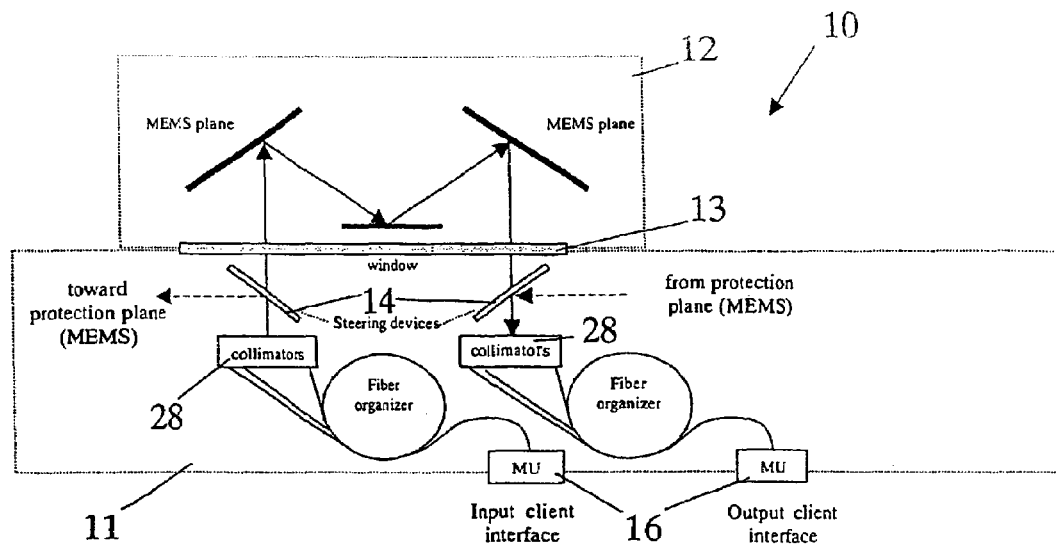
FIG. 1 shows diagrammatically an OXC with MEMS in accordance with the present invention.

With reference to the figures, FIG. 1 shows diagrammatically by way of example a first embodiment of an OXC designated as a whole by reference number 10 in accordance with the present invention. The optical unit is divided in two main bodies, to wit one section 11 for connection and comprising the collimators 28 and a section 12 for switching with the MEMS. The first section is a fixed part not designed to be replaced, relatively simple and therefore reliable. The second section is a replaceable section containing the movable mirrors with MEMS technology and associated control parts. The two sections face each other through a window 13. As shown below, the replaceable MEMS section also comprises devices for accurate realignment of the structure with the collimator arrays in the fixed part. For the sake of simplicity only one MEMS optical path is shown diagrammatically.

The window 13 can be sealed with a glass plate with appropriate antireflection coatings or can comprise protective shutter means not shown which close upon separation of the two sections and open upon coupling of the two sections. This second solution further reduces losses along the path of the beams. Protective caps or films to be removed before assembly can also be provided as alternatives.

The collimators and the MEMS units are both built and assembled with precision and tested separately at the factory. The alignment of the MEMS with the collimators is done in the field by means of mechanical devices located in the MEMS unit.

In section 11 of the collimators there are optical means 14 for steering of all or part of the optical signals from and to the MEMS section 12 to a MEMS standby or protection plane not shown in FIG. 1 for the sake of simplicity but similar to the unit 12.

The optical means 14 can be virtually any known type such as flat LCD, MEMS, mechanical shutters et cetera. As will be obvious to those skilled in the art, if LCD technology is employed the steering can be realized selectively on the basis of the individual channel and increasing the versatility of the equipment.

The interface 16 with the client requires connectors for the individual fibers to be able to disconnect each beam individually. To reduce losses these connectors are advantageously connected to the arrays of collimators 15 without any further internal connector. This loss reduction can compensate for the introduction of the steering means 14.

Figure 2:
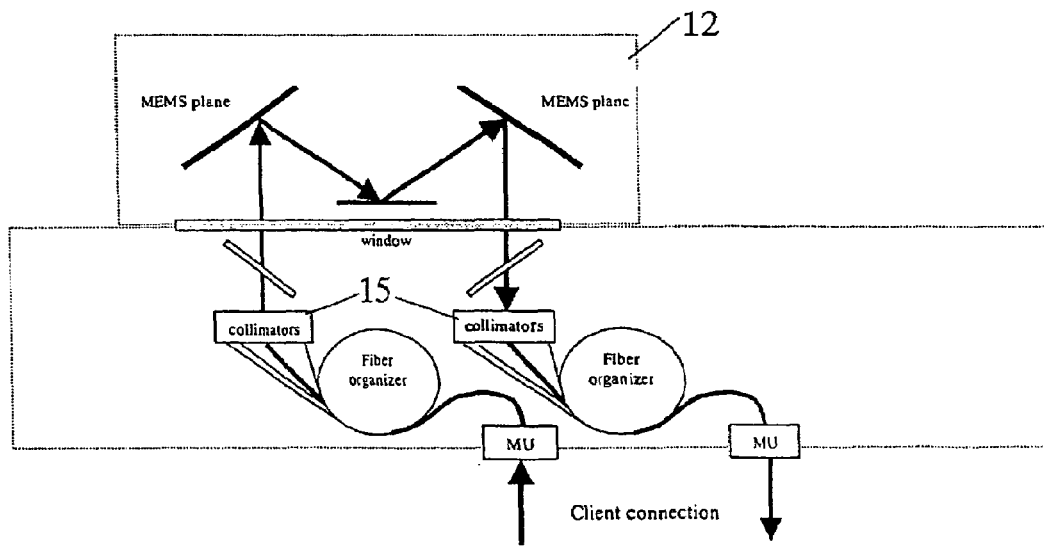
FIG. 2 shows diagrammatically the device of FIG. 1 in case of normal operation.

FIG. 2 shows the device 10 during normal operation. When the flat MEMS operates normally the steering means 14 offer full transparency to the beams between the MEMS unit 12 and the collimators 15.

It is advantageous that only the optical part of the steering devices be located in the collimator block while no electronic part is located in said block.

As clarified below, input and output optical power can be detected with an outlet on each input and output fiber although this involves an increase in design complexity or using a CCD device under the fixed central mirror in the MEMS structure, realizing said mirrors with partial reflection or as an alternative additional semitransparent mirrors can be provided in the collimator section or the MEMS. In any case it is advantageous that the electronics be kept out of the nonremovable sections to improve reliability.

Figure 3:
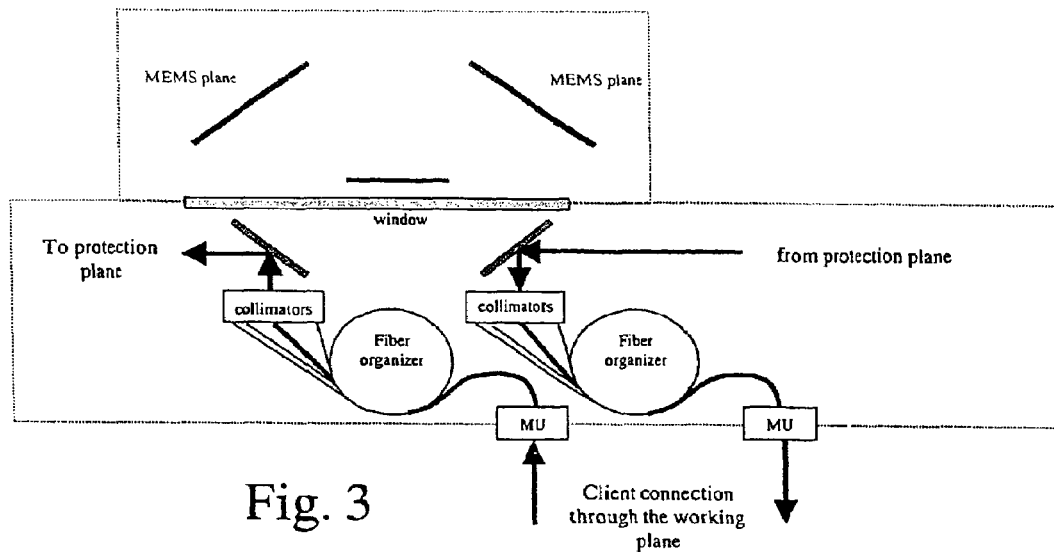
FIG. 3 shows diagrammatically the device of FIG. 1 in case of emergency operation after a failure of the main MEMS unit.

In case of problems in the MEMS section, which can be detected by the above mentioned power monitoring devices, the steering means 14 are activated to offer full reflection to the beams from and to the collimators so as to insulate the main MEMS section from the optical paths. This is shown in FIG. 3.

Under this condition the main MEMS section can be removed and replaced by a new unit while the switching functions are assured by the protection plane towards which the means 14 deflect the optical paths.

Figure 4:
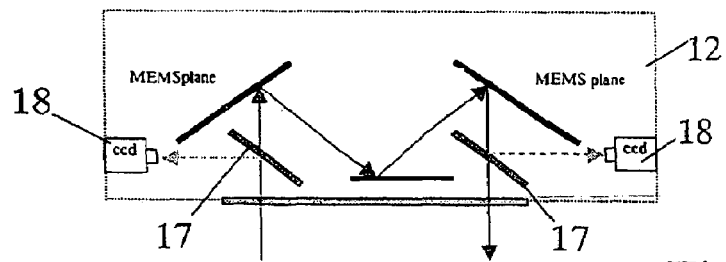
FIG. 4 shows diagrammatically a first solution for monitoring the optical power at input to and output from the device.

FIG. 4 shows diagrammatically a first solution for detection of the MEMS unit input and output signal power. In this solution partially reflecting mirrors 17 an CCD devices 18 are provided in the MEMS section. This way, a small part of the beams from and to the MEMS nucleus are sent to the CCDs which allow the electronics to make input and output power measurements and detect any anomalies or failures.

Figure 5:
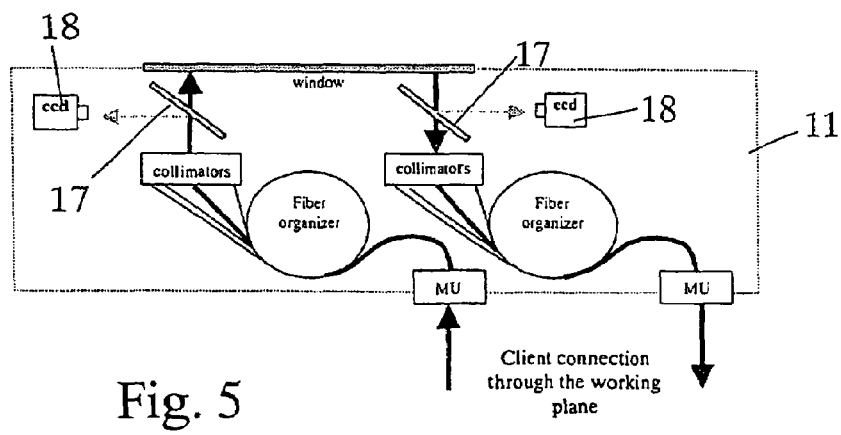
FIG. 5 shows diagrammatically a second solution for monitoring the optical power input to and output from the device.

FIG. 5 shows a variant in which a similar concept is applied in the collimator section 11. In this second case the CCD devices 18 are illuminated by semireflecting mirrors 17 which can coincide with the steering means 14 appropriately realized and controlled. Advantageously the CCD sensors can be realized to be easily replaceable for improving system reliability.

As mentioned above, finely accurate positioning is required for alignment of the MEMS section with the collimator sections. Positioning should be accurate in approach direction (Z) of the two sections and in the two directions (X,Y) transversal to said approach direction.

Figure 6:
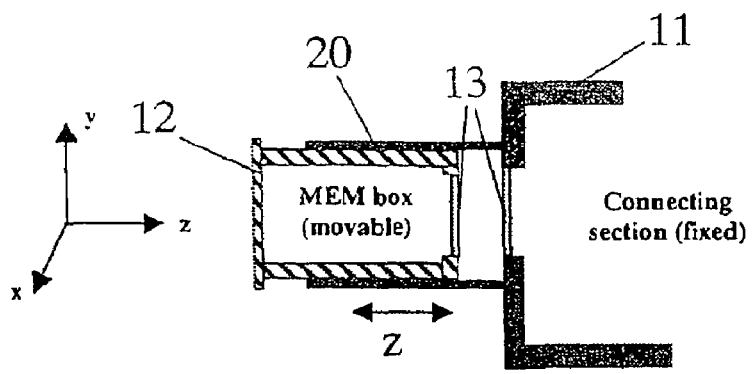
FIG. 6 shows diagrammatically an assembly detail of the device in accordance with the present invention.

In direction Z there may be provided a simple system of running on guides for approach of the two sections with a mechanical stop at the end of travel to lock the two sections together with the desired precision, for example with an accuracy near 100 μm. FIG. 6 shows diagrammatically a similar running structure in which the container 12 of the MEMS section runs along guides 20 extending in the approach direction Z and projecting from the section or unit 11 of the collimators.

Figure 7:
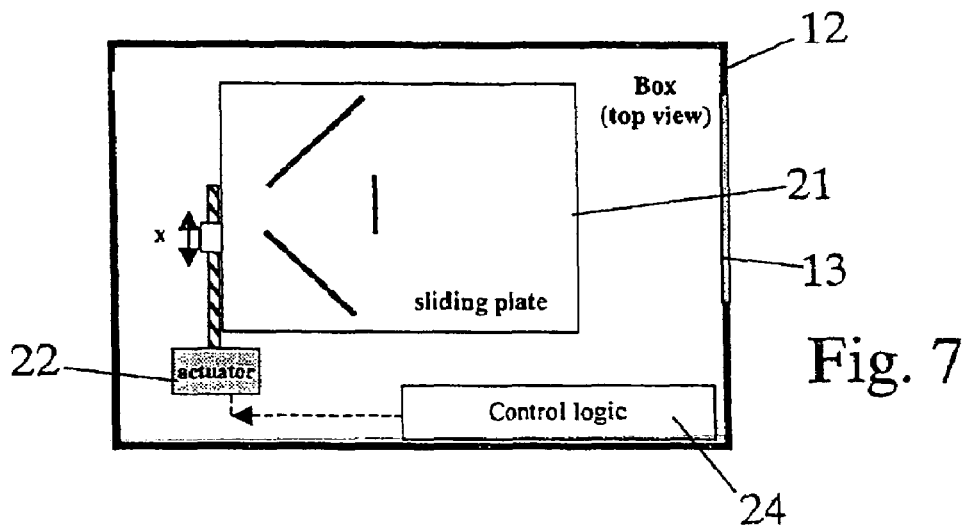
FIG. 7 shows diagrammatically a second assembly detail of the device in accordance with the present invention.
Figure 8:
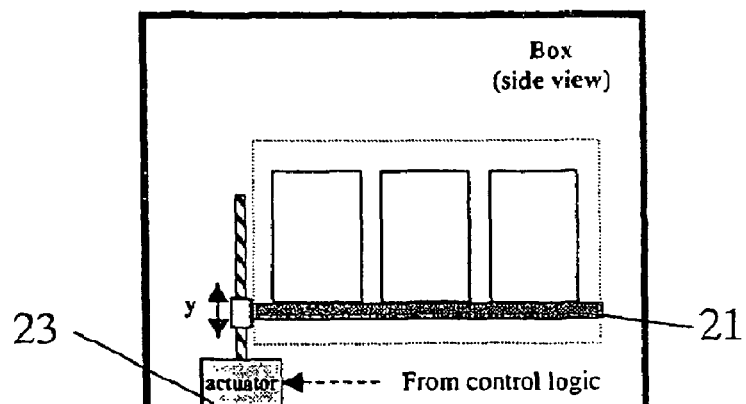
FIG. 8 shows diagrammatically a third assembly detail of the device in accordance with the present invention.

FIGS. 7 and 8 show a diagram of fine positioning of the MEMS unit along axis X. In this embodiment the planes of the mirrors and the associated accessorial optical parts are fixed on a single plate 21 with low thermal drift. As may be seen in the figures, the plate can move in relation to the MEMS unit container along directions X and Y by means of actuators 22, 23 of suitable precision and controlled by an appropriate control logic 24 in the container.

The precision traversing plates can be roughly positioned manually first and then finely by means of an end adjustment section, for example piezoelectric, for in-line position control.

For control of positioning errors error detection systems could be considered for error detection with feedback control of plate position.

The sources of errors may be diverse. But it may be assumed that the angular errors of alignment and the errors along the axis z are limited by the mechanical precision.

In addition, the angular errors are intrinsically compensated by the oscillating structure of the MEMS mirrors while errors along axis z are not critical if compared with the travel of the optics.

The critical errors which need compensation through a control system are therefore essentially those along axes x and y.

Naturally additional position controls can be added to compensate for unexpected errors.

Figure 9:
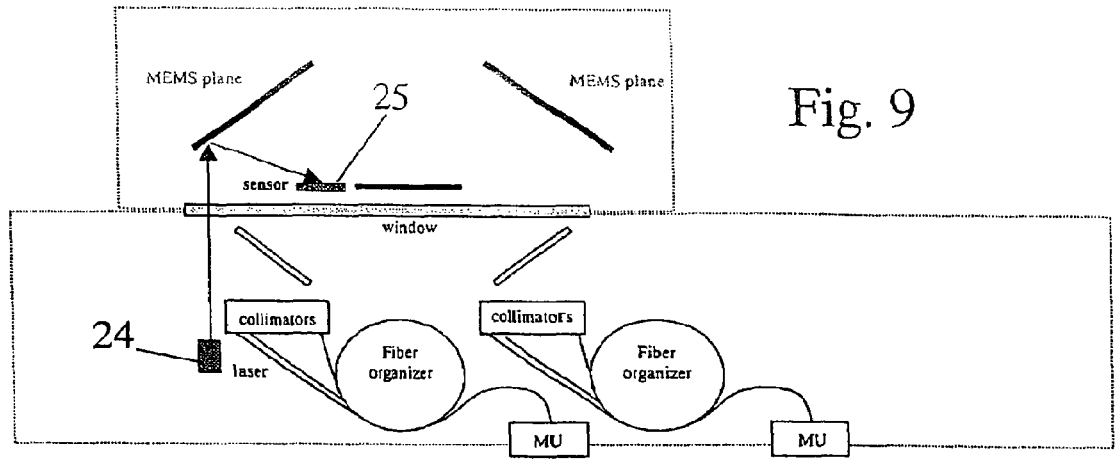
FIG. 9 shows diagrammatically the apparatus in accordance with the present invention equipped with a positioning error detection system.
Figure 10:
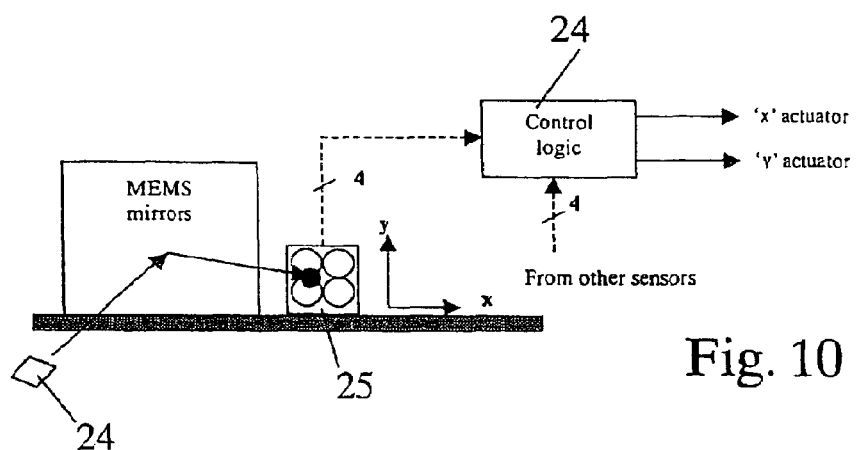
FIG. 10 shows diagrammatically an assembly detail of the positioning system of FIG. 9.

FIG. 9 shows a possible advantageous system of position error detection. This system comprises a laser source 24 fastened to the subunit of the collimators and producing luminous beams pointed at the fixed mirrors located on the plane of the MEMS mirrors. The beams are then reflected onto a sensor 25 with four quadrants as seen better in FIG. 10 in the X-Y plane and located on the MEMS unit support plate. The basic assumption is that the collimator and MEMS modules are each assembled accurately and only the relative positioning is unknown.

The control logic 24 controls the x-y positioning actuators by means of a closed loop to compensate continuously for mechanical shifts due for example to aging of the components and temperature drifting.

Figure 11:
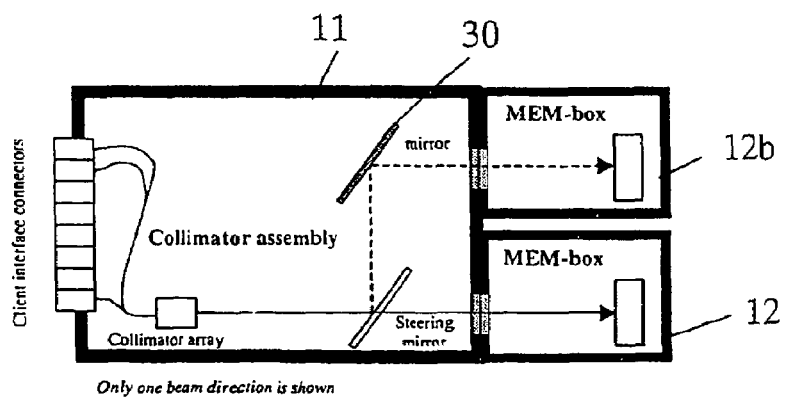
FIG. 11 shows diagrammatically an embodiment of a 1:1 OXC in accordance with the present invention.

FIG. 11 shows diagrammatically the simplified embodiment of a 1:1 OXC in which the MEMS work plane 12 and the MEMS protection plane 12b are both connected to the same collimator unit. For the sake of simplicity only one beam direction is shown. In the embodiment of FIG. 11 another return mirror 30 is added to enable mounting of both MEMS modules on the same side of the basic collimator module. As may be seen, this arrangement allows realization of a complete and compact OXC with two removable integrated MEMS matrices. Insertion losses are very much reduced to avoid additional connectors and/or collimators. The interface with the client can be realized by means of multifiber tape connectors. Access to single channels can be achieved by means of single fiber connectors located on dedicated frames.

A rack structure of the assembly can be realized for example with a rack containing at the rear the collimator unit and at the front the two MEMS modules so that the latter can be readily drawn out and replaced in case of need.

Figure 12:
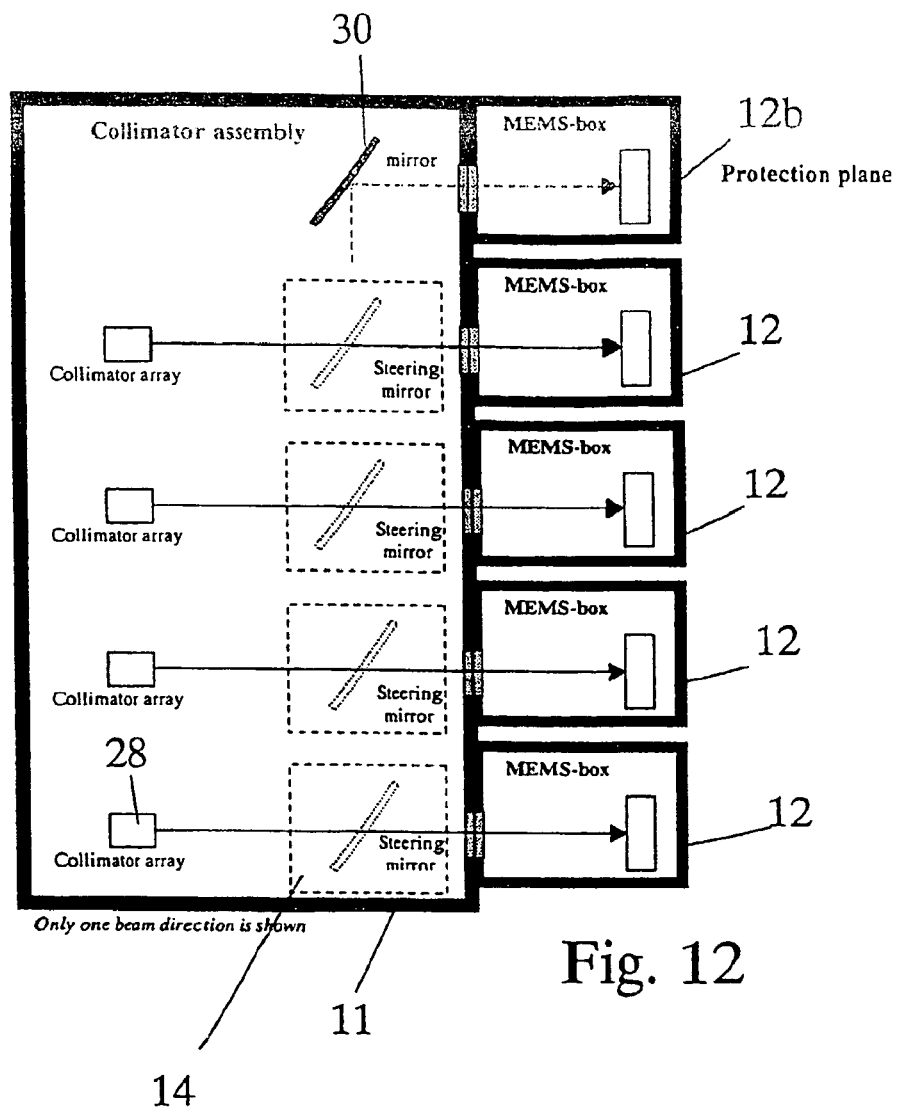
FIG. 12 shows diagrammatically an embodiment of an N:1 OXC in accordance with the present invention.

FIG. 12 shows diagrammatically a modular OXC similar to the one of FIG. 11 but with generalization to N modules. For the sake of simplicity, the figure is limited to N=4 and only the input direction of the beams in the MEMS is shown. As may be seen in the figure, a single 3D-MEMS module can be used to protect any one of the remaining MEMS planes. The collimators can be sealed in a single unit supplied with horizontal windows optically connecting the various MEMS units, each in its own removable container, to the collimators.

Figure 13:
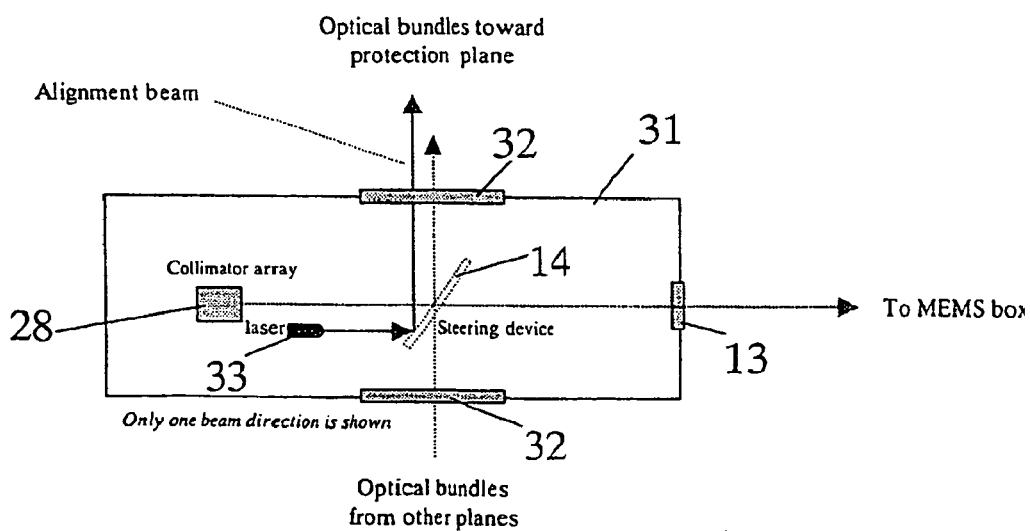
FIG. 13 shows diagrammatically a variant embodiment of a part of the device in accordance with the present invention.

In the various embodiments and in particular in the N:1 OXC embodiment it may be advantageous to place the various steering means 14 within the collimator assemblage and if necessary seal all in dedicated containers easy to replace. FIG. 13 shows a similar embodiment with a modular container 31 containing the collimator array 28 and the steering device 14 and which is equipped with the front window 13 for optical connection with the MEMS module and opposing side windows 32 to allow the deflected beams to traverse the containers.

The containers 31 can be packed together side-by-side to realize the structure of FIG. 12.

As may be seen again in FIG. 13, each unit 31 can be equipped with a laser 33 to supply an alignment beam for the side-by-side modules. As shown in FIG. 14, which shows the side view of the module shown in plan view in FIG. 13, the collimator, laser and steering device can be fastened onto the same substrate which provides a frame movable on the horizontal plane by means of precision traversing plates with if necessary electrically adjustable operating means 35, 36 to allow accurate alignment of the modules using the alignment laser 33 and if necessary an appropriate receiving sensor (not shown). The precision of the vertical direction position (Y) is ensured by the precision of the mechanical framework which receives the modules.

FIGS. 15 and 16 show an advantageous arrangement of the modular members inside a subrack. As seen, there is the collimator unit (not replaceable) and drawer units for each steering device 14 and each MEMS 12, 12b.

Naturally if being able to quickly replace the steering devices is not considered useful these devices can be inserted permanently in the collimator unit 11.

If the steering devices are in replaceable modules, appropriate windows 40 are provided for optical connection to the other modules.

Figure 17:
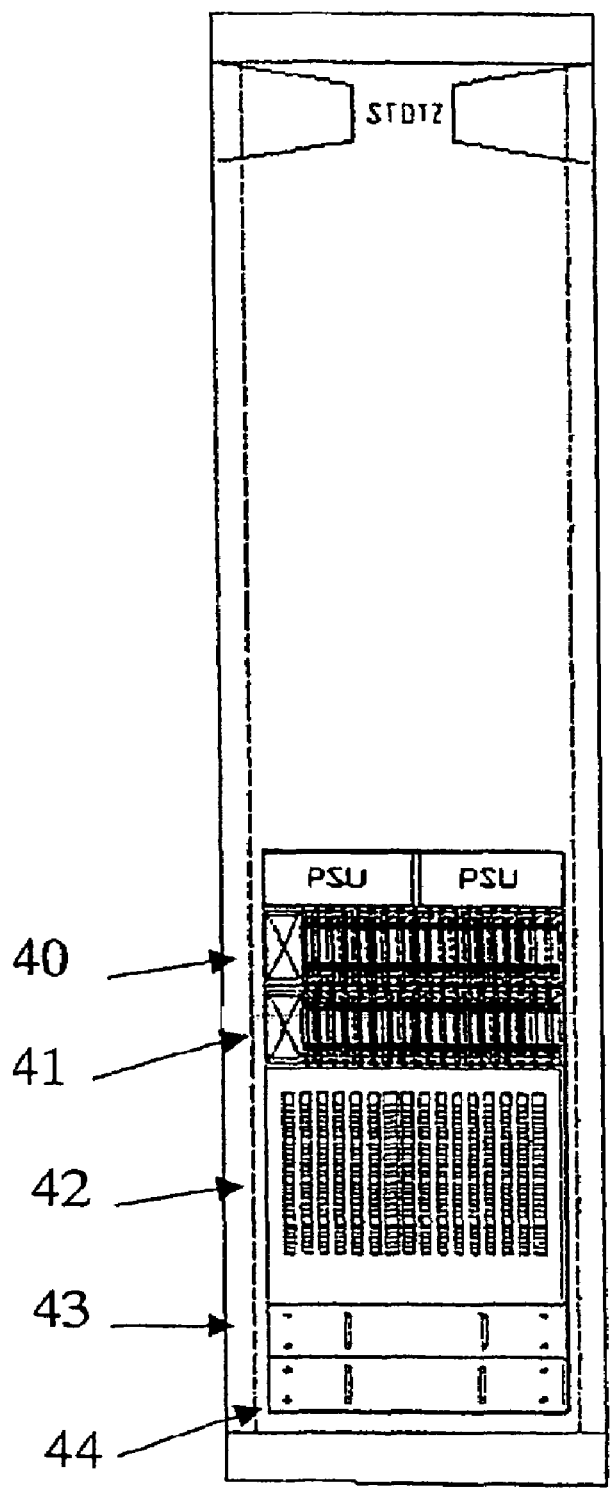
FIGS. 17 and 18 show diagrammatically front and side views of a rack containing a modular embodiment of an OXC applying the principles of the present invention.
Figure 18:
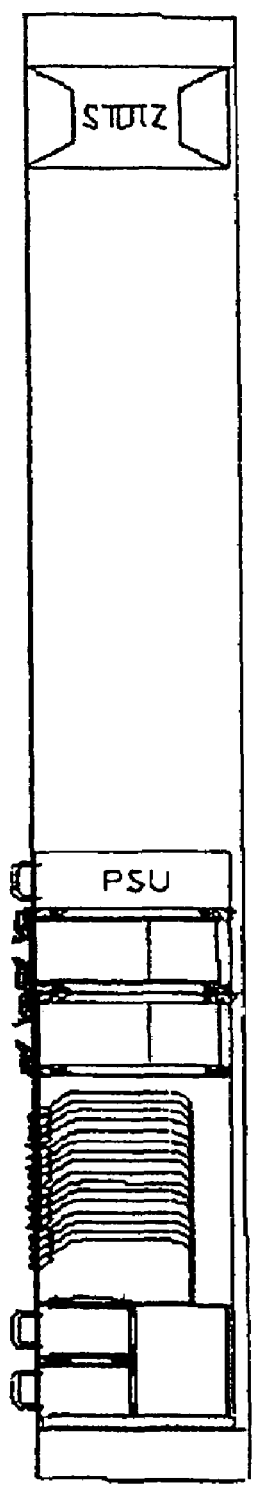

FIGS. 17 and 18 show diagrammatically the possible advantageous arrangement of parts in a rack to realize a complete OXC system in accordance with the present invention. For the sake of simplicity a 1:1 OXC embodiment is shown. On the basis thereof the N:1 embodiment can be readily imagined by those skilled in the art.

As may be seen in the figures, from top to bottom there are provided superimposed main control and operating cards 40, control and operation standby cards 41, connectors 42 for the client interface (LC or MU), the main removable MEM modules 43 and the removable protective MEM modules 44.

It is now clear that the predetermined purposes have been achieved by making available modular OXCs with MEMS and with high performance, easy maintenance and expansion and relatively low costs.

Naturally the above description of an embodiment applying the innovative principles of the present invention is given by way of non-limiting example of said principles within the scope of the exclusive right claimed here.

For example the steering means arranged in the collimator units can be realized removable, for example supported in a third section separable from the other two to facilitate repairs. The connector units in the collimator section can be realized with known coupling systems for selective withdrawal and replacement thereof without mutual interference.

The invention claimed is:

1. A cross connect system for optical telecommunication networks, comprising: input and output ports interconnected by means of switching members; and a connecting section including, in turn, said ports and a main switching section having the switching members as MEMS devices, the switching section being contained in a removable box, and the connecting section including optical steering means for intercepting on command optical paths between the two sections from and to the connecting section to steer them from the main switching section towards a protective switching section, the MEMS devices being supported in the box by a support system arranged to provide controlled movement of the MEMS devices for alignment of the MEMS devices with the optical paths.

2. The system in accordance with claim 1, in that the protective switching section comprises additional switching members as MEMS devices which are housed in an additional removable box.

3. The system in accordance with claim 2, in that at least the switching means are housed in a removable box for replacement.

4. The system in accordance with claim 1, and sensors in the switching section, for detecting input optical power to, and output optical power from, the main switching section.

5. The system in accordance with claim 4, and sensors in the connecting section, for detecting input optical power to, and output optical power from, the main switching section.

6. The system in accordance with claim 5, in that the sensors are illuminated CCDs intercepting part of the optical paths with semireflecting mirrors.

7. The system in accordance with claim 1, in that the switching sections are a plurality, and in that the connecting section comprises a unit made up of an array of collimators and optical steering means for each switching section.

8. The system in accordance with claim 7, in that each collimator array and optical steering means unit is in turn housed in a replaceable box.

9. The system in accordance with claim 8, in that each removable box comprises means for alignment detection and means for alignment adjustment.

10. The system in accordance with claim 7, in that at least the steering means of each unit are housed in replaceable removable boxes.

11. A telecommunication system comprising a cross connect system in accordance with claim 1.

12. The system in accordance with claim 1, in that the support system is arranged to align the optical paths in an approach direction and in two directions transverse to the approach direction.

13. The system in accordance with claim 1, further including guides extending in an approach direction to the connecting section along which the switching section is arranged to run to provide said alignment 14. The system in accordance with claim 1, in that the MEMS devices include planes of mirrors, and in that the system includes a single plate on which the planes of mirrors are fixed.

15. The system in accordance with claim 14, in that the plate is arranged to be moveable in relation to the switching section in two directions transverse to an approach direction.

16. The system in accordance with claim 15, including actuators for moving the plate.

17. The system in accordance with claim 16, including control logic for controlling the actuators.

18. The system in accordance with claim 17, in that the control logic is arranged to control actuators by means of a closed loop to compensate continuously for mechanical shifts.

19. The system in accordance with claim 1, further comprising a laser position sensing system for sending a laser beam between the connecting section and the switching section for verification of the alignment.

20. The system in accordance with claim 19, in that the laser position sensing system includes a position sensor which comprises four quadrants for monitoring a position of the laser beam.

21. A cross connect system for optical telecommunication networks, comprising: input and output ports interconnected by means of switching members; and a connecting section including, in turn, said ports and a main switching section having the switching members as MEMS devices, the switching section being contained in a removable box, and the connecting section including optical steering means for intercepting on command optical paths between the two sections to steer them from the main switching section towards a protective switching section, the optical steering means being arranged on optical paths between collimators and optical connection windows with the main switching section.

22. A cross connect system for optical telecommunication networks, comprising: input and output ports interconnected by means of switching members; and a connecting section including, in turn, said ports and a main switching section having the switching members as MEMS devices, the switching section being contained in a removable box, and the connecting section including optical steering means for intercepting on command optical paths between the two sections to steer them from the main switching section towards a protective switching section, the main switching section box and the protective switching section box being arranged side by side and facing each other with a respective optical path passage window on a corresponding connecting section window.

* * * * *